Aug. 13, 1935.  H. J. CRINER  2,011,473
SLICING MACHINE
Filed Jan. 27, 1930   2 Sheets-Sheet 1
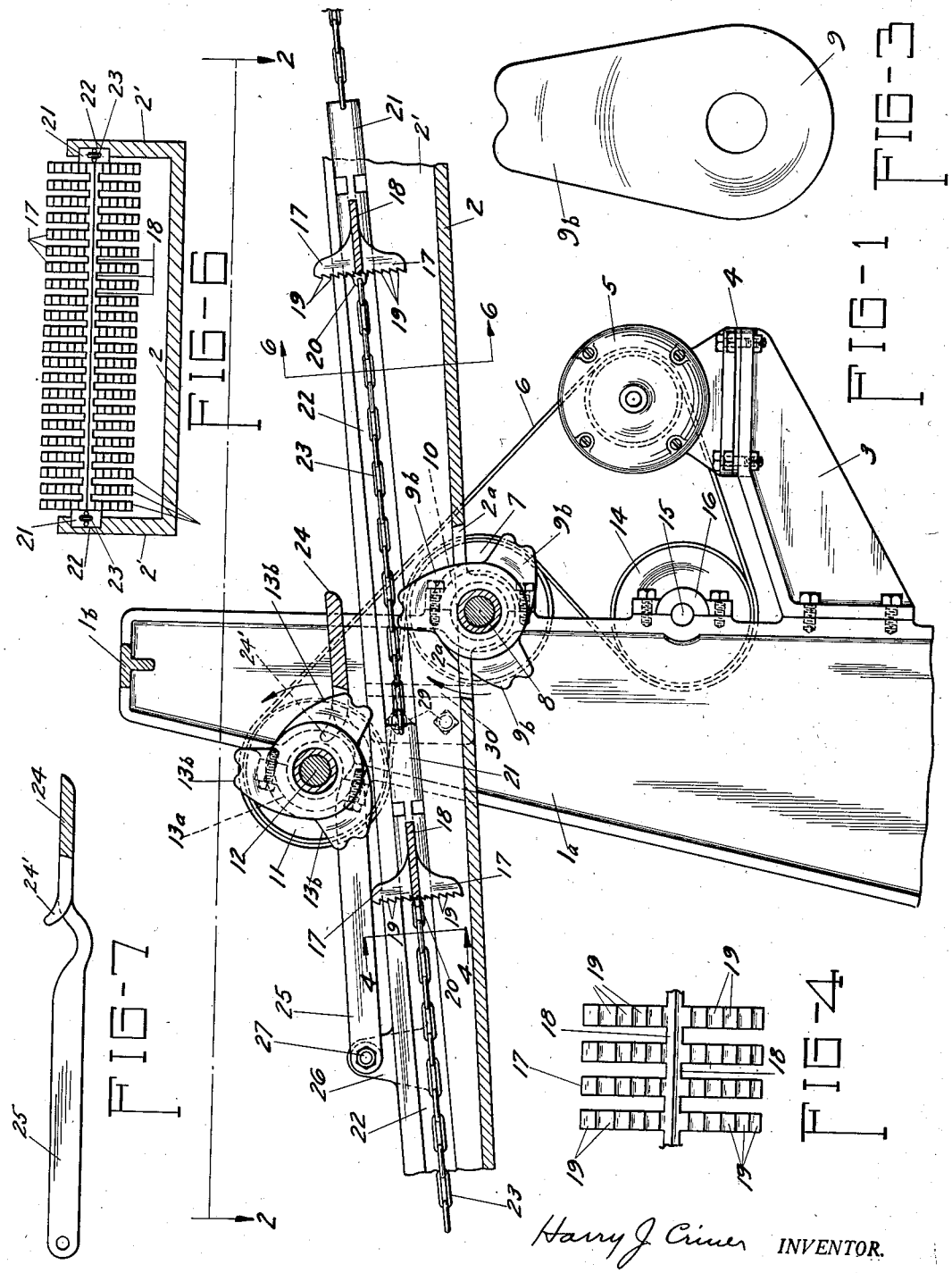
Harry J. Criner INVENTOR.
BY
Curtis Bush ATTORNEY Aug. 13, 1935.                H. J. CRINER                2,011,473
                            SLICING MACHINE
                         Filed Jan. 27, 1930            2 Sheets-Sheet 2
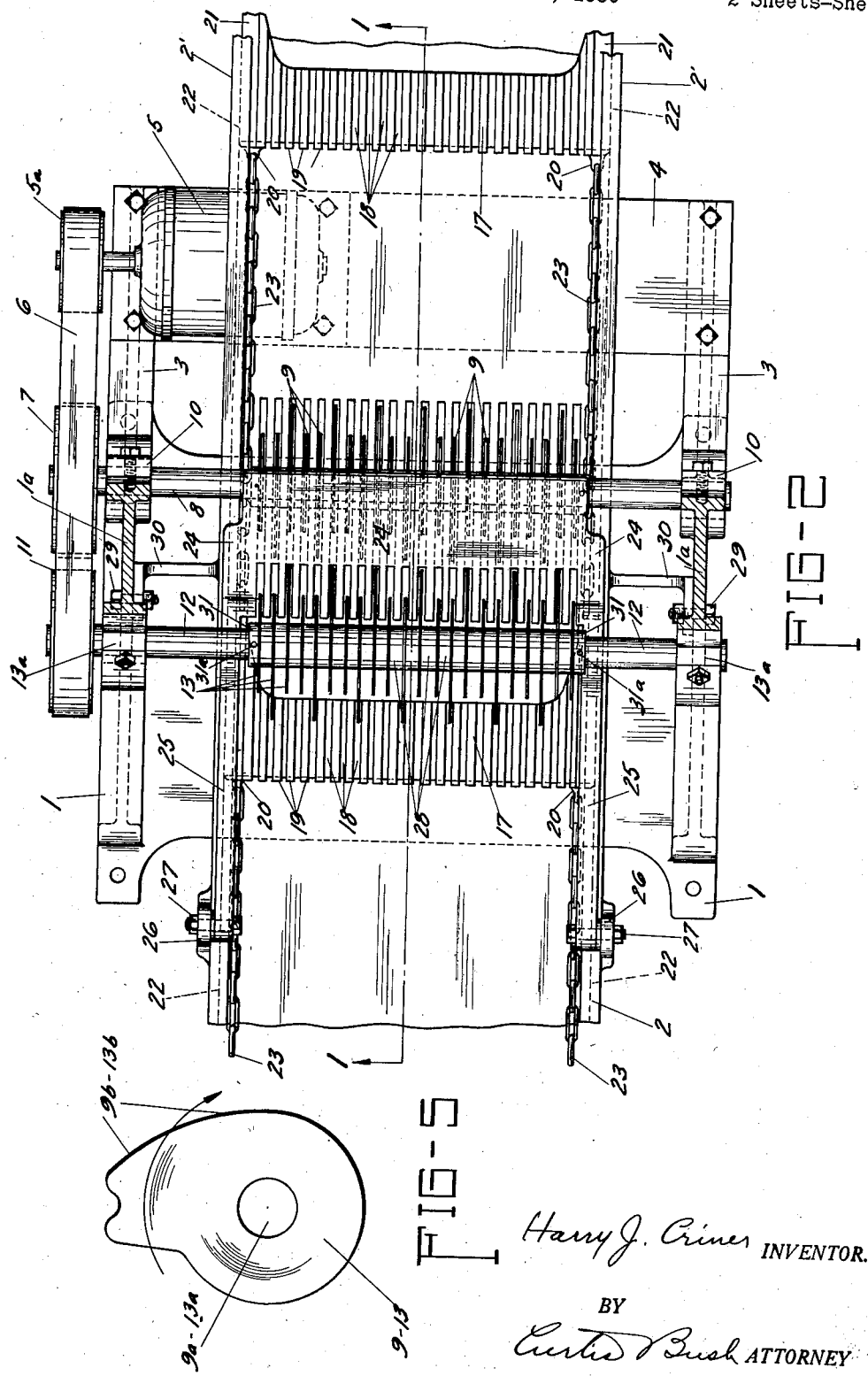
Harry J. Criner INVENTOR.
BY
Curtis Bush ATTORNEY Patented Aug. 13, 1935

2,011,473

UNITED STATES PATENT OFFICE 2,011,473

SLICING MACHINE

Harry J. Criner, Davenport, Iowa, assignor, by mesne assignments, to The Micro Corporation, Bettendorf, Iowa, a corporation of Delaware Application January 27, 1930, Serial No. 423,669

12 Claims. (Cl. 146—98)

My invention relates to improvements in slicing machines for slicing bread, particularly to machines designed to slice an entire loaf at one time in slices of uniform thickness with cuts extending into the bread from two opposite directions, but leaving a small portion of the loaf uncut between each pair of adjacent slices.

The objects of my invention are:

1. To provide a machine of the class described, of superior efficiency;

2. To provide blades for a machine of the class described which will reduce to a minimum compression upon the sliced portions of the loaf while passing through the cutting blades;

3. To provide a form and arrangement of cutting blades upon a single shaft which will reduce to a minimum the compression upon a given loaf as it comes into initial contact with the cutting blades;

4. To provide a plurality of sets or series of cutting blades, each set or series being mounted upon a separate shaft, with the shafts so positioned and arranged as to reduce the compressive effect of the cutting blades upon the loaf when the cutting action is initiated;

5. To provide a machine of the class described in which a plurality of shafts spaced apart, each shaft bearing a separate series of cutting blades, may be utilized in combination with a continuous feeding appliance.

I attain these objects by the means illustrated in the accompanying drawings, in which,—

Figure 1 is a vertical section of my machine upon the line 1—1 of Figure 2, but with the ends of the feed table broken away and omitting the base;

Figure 2 is a top or plan view of the central portion of my machine, but showing the frame in section on the line 2—2 of Figure 1;

Figure 3 is an enlarged detail showing my preferred form of cutting blade;

Figure 4 is an enlarged detail showing a portion of a feeder unit;

Figure 5 is a detail showing an alternative form of cutting blade;

Figure 6 is a cross-section of the chute on the line 6—6 of Figure 1; and Figure 7 is an enlarged detail of the arm, 25.

Similar numerals refer to similar parts throughout the several views.

My machine comprises a base, 1, preferably of cast-iron or other suitable material, with side frame members, 1a, suitably secured thereto or formed integral therewith. A chute, comprising a bed, 2, with side members, 2', is secured to the side members, 1a, by arms or brackets, 30, formed integral with or suitably secured to the chute, and united to the side frame members, 1a, by bolts 29, or other suitable form of attachment.

The bed, 2, of the chute, has its middle portion provided with a series of longitudinal slots, 2a, corresponding in number to the number of cutting blades or cutters mounted upon the lower cutter shaft, 8. These slots, 2a, are of sufficient width to permit the cutters, 9, to pass freely therethrough. The cutter shaft, 8, is mounted in suitable bearings, 10, which bearings are formed in or united to the side frame members, 1a, and may be of any of the well-known forms as desired. A second or upper cutter shaft, 12, is similarly mounted in bearings, 13a.

A pulley, 11, is mounted upon one end of the shaft, 12, and a pulley, 7, mounted upon the corresponding end of the shaft, 8, adapted to be driven by a belt, 6, which passes over a pulley 5a, secured upon the shaft of a motor, 5, and driven thereby. An idler pulley, 14, mounted upon a shaft, 15, is provided to aid in giving the belt the proper direction of travel and cause it to operate snugly upon the pulley, 7. The shaft, 15, may be mounted in a bearing, 16, which may be of any desired type and secured to the side frame members, 1a, by bolts or other suitable means.

The motor, 5, is preferably mounted upon a cross-bar, 4, which extends transversely of the machine near the front thereof and is supported upon brackets, 3, which in turn are secured to the side frame members, 1a, by bolts, set screws or other suitable means.

In machines of this class, in using a series of circular cutters or blades, some difficulty has been found on account of the lateral pressure of the blades upon the slices and to avoid this difficulty I have devised a form of blade which at high speed will be equally efficient in slicing the bread, but which will, to a great extent, overcome the difficulty of lateral pressure and consequent jamming which interferes to some extent with the evenness of the cutting and the speed of operation.

In describing my blade, 9, I refer for convenience to the circular portion of the blade or cutter as the body and to the extended part, 9b, of the blade, as the cutting portion thereof. My description of the blades, 9 applies equally to the blades, 13, as similar blades will ordinarily be used in both series, although I do not limit my claims to such a construction, as there may be cases in which a variation in the form of the cutting blades, 13, from the cutting blades, 9, will be desirable.

In the preferred form of my blade, I use a cam shaped blade as illustrated in Figure 3. The body of the blade is substantially circular and the cutting portion extends outwardly from the circular portion for substantially the full depth of the cut intended to be made, although I prefer to have a portion of the body extending into the cuts in the bread, in which position the body will tend to spread the slices slightly apart and facilitate the entrance of the cutting portions of the blades and when so adjusted, the portion of the edge of the body adjacent the extended portion may also be sharpened. The forward and outer edges of the cutting portions of the blade are preferably sharpened and the cutting portion may be thinned down so as to be materially thinner than the body of the blade.

The extreme outer portions of the edge of the cutting portion of the blade may be indented or sinuated as shown in Figure 3 and I prefer to use the sinuate form, but if desired, the cutting edge of the blade may be formed in a regular line constantly increasing its distance from the center of the shaft upon which the blade is mounted and the rate of increasing such distance may be varied without departing from the spirit of my invention.

The blades, 9, are mounted upon the shaft, 8, rigidly and the blades, 13, are mounted rigidly upon the shaft, 12. The blades upon both shafts are uniformly spaced apart with spacers, 28, mounted upon the shaft between them. These spacers may be of steel or other suitable material.

The blades ordinarily will be mounted approximately half an inch apart, as that seems to be the most desirable thickness for slicing bread, but the spacers may be of any desired width.

In mounting the blades upon the shafts, I mount them in staggered relation. In the drawings I have shown the blades so staggered that the cutting portions of adjacent blades have an angular variance of approximately 120° and when so placed, the shortest distance between any two blades mounted in the same angular position would be an inch and a half. With ordinary fresh bread, an inch and a half of bread will stand sufficient compression to permit the passage of thin cutting blades without interfering materially with the smooth cutting thereof. By setting the blades with an angular variation of 60°, the shortest distance between two similarly mounted blades may be increased to three inches, which would still more reduce the compressive effect upon the bread between such blades. The angular relation of the blades may be varied to suit the requirements of any particular case without departing from the spirit of my invention, but for the white bread most commonly produced by bakers and in most common use, I prefer to place the blades in a single spiral formation as that form will produce the least lateral pressure upon the slices.

Blades such as I have described and mounted as described, may be placed upon shafts which are secured in substantially the same plane vertically, as the shafts are arranged in my co-pending application Serial No. 424,849, filed January 31, 1930, or the shafts bearing the blades, may be spaced a short distance apart vertically and a substantial distance apart horizontally so that the action of the first set of cutters will be completed or partially completed before the action of the second set of cutters begins.

Any suitable form of feeding apparatus may be provided, but I prefer to space the cutter shafts apart laterally sufficiently to permit the use of a continuous chain or belt-driven feeding apparatus utilizing feeding heads comprising a bar-shaped body, 18, with vertically extending fingers, 17, united thereto and spaced apart so that the openings between the fingers will travel in the paths traversed by the cutting blades. The fingers, 17, are provided with teeth, 19. The ends of each body, 18, form guides, 21, which slide in channels, 22, formed in the side bars, 2', of the chute. The channels, 22, incline downwardly from the front to the rear of the machine and the bodies, 18, are made thin enough so that when traveling down the chute, they will pass between the series of cutting blades and clear both series.

Chains, 23, are linked to the feeding heads or rather, to the guides, 21, united to the ends of the feeding heads, and are driven from the right to the left of Figure 1 by any desired means. I do not claim in this application any specific form of feeding device and therefore I have not shown the driving means for driving the chains, 23, and have only shown a portion of the chains, 23, and the feeding heads united thereto.

The bread may be placed upon the bed, 2, of the chute at the front of the machine either manually or by any mechanical means and as the feeding heads are drawn down the chute by the chain, 23, the bread is carried forward by the fingers, 19, and the lower portion of the loaf is sliced by the series of blades, 9. To prevent the loaf being sliced by the blades, 9, from being rolled over or displaced, I provide a presser-board, 24, extending transversely of the machine, with forwardly extending fingers which extend between the cutting blades, 13. The presser-board, 24, is secured at the front end of a pair of arms, 25, mounted upon opposite sides of the chute and secured by pivots, 27, to bosses or lugs, 26, formed integral with the chute or suitably secured thereto. The presser-board is secured by suitable stops in its desired position and is free to move upwardly so as to admit loaves of bread of varying thickness, it being found that there is a slight variation in both the width and height of various loaves coming from the same batch of bread. The presser-board, 24, and arms, 25, are preferably formed of sufficient weight so that the force of gravity will be sufficient to prevent the bread being displaced upwardly by the action of the blades, 9, or the blades, 13, and the fingers, 24', will prevent the bread from being forced back after it has been brought to the cutting blades by the feeding apparatus.

It is obvious that various changes may be made in the form and arrangement of parts without departing from the spirit of my invention and I do not limit my claims to the precise forms of apparatus shown in the drawings.

In the operation of my device, the motor is started and when the motor shafts have been speeded up to normal speed, which should preferably be approximately 3500 R. P. M. but may be varied as varying conditions require, the bread is placed, a loaf at a time, upon the bed, 2, of the chute at the front end of the machine and each loaf is carried forward by one set of fingers, 19, the loaf resting upon the bed, 2, of the chute and sliding along thereon. As the bread reaches the cutting blades, 9, they begin to cut at the lower advancing corner thereof, regardless of whether the loaf is resting upon its bottom or one side.

As the direction of the first cut of the cutters, 9, is downward, it is not necessary to have the presser board extend farther to the front than the shaft, 8.

As the bread slides along the bed, 2, the cutters, 9, make a series of parallel cuts or slits therein extending upward the full length of the cutting portions, 9b, thereof. The cutters, 13, are mounted in the same vertical planes as the cutters, 9, and as the advancing edge of the bread passes the cutters, 9, it comes in contact with the cutters 13, and the cutting portions 13b, thereof make slits or cuts in the upper portion of the loaf which correspond to the cuts in the lower portion of the loaf made by the cutters, 9, but leave a small portion of the loaf uncut approximately at the middle line thereof.

As the bread passes the cutters, 13, it is carried on down the bed, 2, of the chute and may be removed manually or fed directly to a wrapping machine mechanically.

I claim:

1. A bread slicing machine comprising a frame, a feeding table mounted thereon having a series of longitudinal slots formed therein, a lower cutter shaft mounted in the frame adjacent and below the slotted portion of the feeding table, an upper cutter shaft mounted in the frame above the feeding table, a series of flat cutting blades mounted upon each of said cutter shafts, each of said blades comprising a substantially circular body portion with a projecting cutting portion united thereto, said blades being uniformly and correspondingly spaced apart upon said shafts and each pair of opposing blades being revoluble in the same plane, and means for feeding the bread along the feeding table to the lower series of blades and then to the upper series blades, the cutter shafts and feeding table being so spaced and the cutting portions of the blades being of such length as to leave uncut a narrow portion of each loaf approximately at the median line thereof.

2. A bread slicing machine comprising a frame, upper and lower shafts revolvably mounted in the frame, said shafts respectively bearing series of flat cutting blades rigidly mounted thereon and uniformly and correspondingly spaced apart, a feeding table secured upon the frame adjacent the lower cutter shaft and having a series of longitudinal slots formed therein above said shaft adapted to permit the cutting blades mounted upon said shaft to extend upwardly through said slots with each revolution of the shaft, means for feeding the bread along said table into contact with said cutting blades, and a weighted presser board pivotally mounted adjacent the upper shaft adapted to prevent upward movement of the bread as it passes through the cutters.

3. A bread slicing machine comprising a frame, upper and lower shafts revolvably mounted in the frame, said shafts respectively bearing series of flat cutting blades rigidly mounted thereon and uniformly and correspondingly spaced apart, a feeding table secured upon the frame adjacent the lower cutter shaft and having a series of longitudinal slots formed therein above said shaft adapted to permit the cutting blades mounted upon said shaft to extend upwardly through said slots with each revolution of the shaft, means for feeding the bread along said table into contact with said cutting blades, and a weighted presser board pivotally mounted adjacent the upper shaft adapted to prevent upward movement of the bread as it passes through the upper cutters.

4. In a loaf slicing machine, a frame, a pair of spaced upper and lower shafts rotatably mounted in said frame, a series of cutters rigidly secured in spaced relation to each shaft, the cutters of one shaft being arranged to rotate in the same plane as the cutters of the other shaft, said cutters being arranged to slice a loaf from opposite sides and leave narrow uncut portions between adjacent slices, and means for feeding the loaves to the cutters, said means comprising a table for supporting the loaves to be sliced from opposite sides thereof, side guides carried by said frame, spaced loaf engaging bars guided by said side guides and movable in an endless path, and means for moving said bars between the two series of cutters, whereby the loaves may be moved through the cutters of said series and whereby the cutters may slice the loaves from opposite sides and leave narrow uncut connection portions between the adjacent slices.

5. In a loaf slicing machine, a frame, a pair of spaced upper and lower shafts rotatably carried by said frame, a series of cutters rigidly secured in spaced relation on each shaft, the cutters on one shaft being rotatable in the same plane as the cutters on the other shaft, the cutting edges of one series, in operation, being arranged in slightly spaced relation relative to the cutting edges of the other series whereby to slice the loaves from opposite sides and to leave narrow, uncut connecting portions between slices, and means for feeding loaves to be sliced to said cutters, said means comprising a table for supporting the loaves, a pair of spaced side guides extending longitudinally of said frame, a plurality of loaf-engaging bars mounted on said side guides, means for moving said bars between the series of cutters, and fingers on said bars arranged to pass between the cutters of one or both of said series.

6. In a loaf slicing machine, a frame, a pair of spaced upper and lower shafts rotatably carried by said frame, a series of cutters rigidly secured in spaced relation on each shaft, the cutters on one shaft being rotatable in the same plane as the cutters on the other shaft, the cutting edges of one series, in operation, being arranged in slightly spaced relation relative to the cutting edges of the other series whereby to slice the loaves from opposite sides and to leave narrow, uncut connecting portions between slices, and means for feeding loaves to be sliced to said cutters, said means comprising a table for supporting the loaves, a pair of spaced side guides extending longitudinally of said frame, a plurality of loaf-engaging bars mounted on said side guides, side links connecting the opposite sides of said bars with the adjacent bars, and means for driving said side links, whereby to move said bars between the series of cutters and feed the loaves to and through said cutters.

7. In a loaf slicing machine, a frame, a pair of spaced upper and lower shafts rotatably carried by said frame, a series of cutters rigidly secured in spaced relation on each shaft, the cutters on one shaft being rotatable in the same plane as the cutters on the other shaft, the cutting edges of one series, in operation, being arranged in slightly spaced relation relative to the cutting edges of the other series whereby to slice the loaves from opposite sides to leave narrow, uncut connecting portions between slices, and means for feeding loaves to be sliced to said cutters, said means comprising a table for supporting the loaves, rotary members at the ends of said frame, continuous side links arranged to pass over and be driven by said rotary members, a plurality of spaced, horizontally extending, loaf engaging bars connected at their ends with said side links, means for rotating the rotary members at one end of said frame, and side guides extending longitudinally of said frame for guiding the loaf engaging bars between the series of cutters.

8. In a loaf slicing machine, a frame, a pair of spaced upper and lower shafts rotatably carried by said frame, a series of cutters rigidly secured in spaced relation on each shaft, the cutters on one shaft being rotatable in the same plane as the cutters on the other shaft, the cutting edges of one series, in operation, being arranged in slightly spaced relation, vertically, relative to the cutting edges of the other series whereby to slice the loaves from opposite sides and to leave narrow, uncut connecting portions between slices, and means for feeding loaves to be sliced to said cutters, said means comprising a table for supporting the loaves, a pair of spaced side guides extending longitudinally of said frame, a plurality of loaf-engaging bars mounted on said side guides, side links connecting the opposite sides of said bars with the adjacent bars, and means for driving said side links, whereby to move said bars between the series of cutters and feed the loaves to and through said cutters.

9. A bread slicing machine comprising a series of upper rotary cutters, a series of lower rotary cutters, each cutter in one series being in the same plane as a cutter in the other series and spaced therefrom, whereby to form opposed slicing cuts from opposite sides of the loaf of bread being sliced with narrow uncut connecting portions between slices, and means for feeding loaves of bread to be sliced to said cutters, said means comprising a table for supporting the loaves, said cutters of the lower series being disposed during operation to extend above said table, an endless conveying means having cross bars for engaging the loaves of bread, an endless side means connecting the ends of said bars, side guides for guiding said conveying means, and means for driving said conveying means whereby to move said cross bars between the series of cutters and feed the loaves of bread to and through said cutters.

10. A bread slicing machine comprising a frame, a lower cutter shaft rotatably mounted in the frame, an upper cutter shaft horizontally offset with respect to the lower shaft and rotatably mounted in the frame above the lower shaft, a series of spaced cutter blades carried by each of said shafts, each blade of one shaft being in the plane of a blade of the other shaft, means for rotating said cutters, and continuously operating means for feeding loaves of bread to one series of blades and then to the other series of blades, said last means including loaf engaging means movable between adjacent blades of each series.

11. A bread slicing machine comprising a frame, a feeding table mounted thereon having a series of longitudinal slots formed therein, a lower cutter shaft mounted in the frame adjacent and below the slotted portion of the feeding table, an upper cutter shaft mounted in the frame above the feeding table, a series of flat cutting blades mounted upon each of said cutter shafts, said blades being uniformly and correspondingly spaced apart upon said shafts and each pair of opposing blades being revolvable in the same plane, and means for feeding the bread along the feeding table to the lower series of blades and then to the upper series of blades, the cutter shafts and feeding table being so spaced and the cutting portions of the blades being of such length as to leave uncut a narrow portion of each loaf approximately at the median line thereof.

12. A bread slicing machine comprising a frame, a lower cutter shaft rotatably mounted in the frame, an upper cutter shaft horizontally offset with respect to the lower shaft and rotatably mounted in the frame above the lower shaft, a series of spaced cutter blades carried by each of said shafts, each blade of one shaft being in the plane of a blade of the other shaft, means for rotating said cutters, and an endless conveying means movable through an endless path and including means movable through adjacent blades of each shaft for feeding loaves of bread to one series of blades and then to the other series of blades.

HARRY J. CRINER.